(12) United States Patent
Bowman et al.

(10) Patent No.: US 9,025,500 B2
(45) Date of Patent: May 5, 2015

(54) SIMULTANEOUS BIDIRECTIONAL TRANSMISSION FOR RADIO SYSTEMS

(71) Applicant: REMEC Broadband Wireless, LLC, San Diego, CA (US)

(72) Inventors: Charles Bowman, San Diego, CA (US); Behzad Moeenziai, San Diego, CA (US)

(73) Assignee: REMEC Broadband Wireless, LLC, San Diego, CA (US)

( * ) Notice: Subject to any disclaimer, the term of this patent is extended or adjusted under 35 U.S.C. 154(b) by 0 days.

(21) Appl. No.: 13/950,112

(22) Filed: Jul. 24, 2013

(65) Prior Publication Data
US 2014/0029482 A1 Jan. 30, 2014

Related U.S. Application Data

(60) Provisional application No. 61/676,269, filed on Jul. 26, 2012, provisional application No. 61/676,263, filed on Jul. 26, 2012.

(51) Int. Cl.
H04B 1/10 (2006.01)
H04B 15/00 (2006.01)
H04B 1/50 (2006.01)
H04L 5/14 (2006.01)

(52) U.S. Cl.
CPC .............. *H04L 5/1461* (2013.01); *H04B 15/00* (2013.01); *H04B 1/50* (2013.01)

(58) Field of Classification Search
None
See application file for complete search history.

(56) References Cited

U.S. PATENT DOCUMENTS

| 3,490,025 | A | 1/1970 | Pickles |
| 4,001,691 | A | 1/1977 | Gruenberg |
| 4,747,160 | A | 5/1988 | Bossard |
| 5,266,961 | A | 11/1993 | Milroy |
| 5,349,363 | A | 9/1994 | Milroy |
| 5,412,394 | A | 5/1995 | Milroy |
| 5,469,165 | A | 11/1995 | Milroy |
| 5,483,248 | A | 1/1996 | Milroy |

(Continued)

FOREIGN PATENT DOCUMENTS

| EP | 2403314 A1 | 1/2012 |
| WO | 2011-148341 A1 | 12/2011 |

OTHER PUBLICATIONS

U.S. Appl. No. 14/030,959 (unpublished).*

(Continued)

*Primary Examiner* — Andrew Chriss
*Assistant Examiner* — Joshua A Kading
(74) *Attorney, Agent, or Firm* — Kilpatrick Townsend & Stockton LLP

(57) ABSTRACT

Disclosed are methods, systems, and apparatus for maximizing the spectral efficiency of a communications spectrum by providing a means to transmit information continuously in both directions of a radio link on the same center frequency at any given time. One embodiment may be directed to a method of communicating in a point-to-point radio system. The method may include receiving a first signal at a first antenna of a radio head. The first signal may include a transmitted data signal and interfering signals. The method continues by determining a correction signal from a transmitter of the radio head and processing the first signal to remove the interfering signals using the correction signal, and sending a second signal using a second antenna. The first and second signals may be sent and received at substantially the same time.

10 Claims, 8 Drawing Sheets

(56) References Cited

U.S. PATENT DOCUMENTS

| | | | |
|---|---|---|---|
| 5,583,524 | A | 12/1996 | Milroy |
| 5,604,505 | A | 2/1997 | Matterer |
| 5,771,567 | A | 6/1998 | Pierce et al. |
| 5,835,068 | A | 11/1998 | Paul et al. |
| 5,905,472 | A | 5/1999 | Wolfson et al. |
| 5,926,077 | A | 7/1999 | Milroy |
| 5,995,005 | A | 11/1999 | Hayashi |
| 6,006,072 | A | 12/1999 | Tsujimoto |
| 6,075,494 | A | 6/2000 | Milroy |
| 6,101,705 | A | 8/2000 | Wolfson et al. |
| 6,201,509 | B1 | 3/2001 | Zhang et al. |
| 6,396,433 | B1 | 5/2002 | Clodfelter |
| 6,426,814 | B1 | 7/2002 | Berger et al. |
| 6,430,805 | B1 | 8/2002 | Ekmekji et al. |
| 6,539,239 | B1 | 3/2003 | Loughran et al. |
| 6,653,985 | B2 | 11/2003 | Sikina et al. |
| 6,717,801 | B1 | 4/2004 | Castell et al. |
| 6,870,733 | B2 | 3/2005 | Castell et al. |
| 7,079,082 | B2 | 7/2006 | Iskander et al. |
| 7,079,816 | B2 | 7/2006 | Khorram et al. |
| 7,119,745 | B2 | 10/2006 | Gaucher et al. |
| 7,127,255 | B2 | 10/2006 | Hsu et al. |
| 7,129,892 | B2 | 10/2006 | Borlez et al. |
| 7,200,379 | B2 | 4/2007 | Edwards et al. |
| 7,206,608 | B1 | 4/2007 | Wu et al. |
| 7,289,494 | B2 | 10/2007 | Lakkis |
| 7,349,439 | B2 | 3/2008 | Lakkis |
| 7,349,478 | B2 | 3/2008 | Lakkis |
| 7,363,058 | B2 | 4/2008 | Gustaf |
| 7,406,647 | B2 | 7/2008 | Lakkis |
| 7,432,871 | B2 | 10/2008 | Milroy et al. |
| 7,545,329 | B2 | 6/2009 | Gaucher et al. |
| 7,558,591 | B2 | 7/2009 | Li et al. |
| 7,583,985 | B2 | 9/2009 | Matson et al. |
| 7,667,652 | B2 * | 2/2010 | Gevargiz et al. ....... 343/700 MS |
| 7,702,371 | B2 | 4/2010 | Edwards et al. |
| 7,792,548 | B2 | 9/2010 | Rofougaran |
| 7,835,769 | B2 | 11/2010 | Gustaf |
| 8,045,935 | B2 | 10/2011 | Lakkis et al. |
| 8,049,676 | B2 | 11/2011 | Yoon et al. |
| 8,073,515 | B2 | 12/2011 | Rofougaran |
| 8,077,644 | B2 | 12/2011 | Lin et al. |
| 8,077,664 | B2 | 12/2011 | Zangi |
| 8,086,182 | B2 | 12/2011 | Rofougaran |
| 8,190,102 | B2 | 5/2012 | Rofougaran |
| 8,243,658 | B2 | 8/2012 | Zangi |
| 2001/0005685 | A1 | 6/2001 | Nishimori et al. |
| 2002/0021764 | A1* | 2/2002 | Posti ............................. 375/296 |
| 2002/0155812 | A1* | 10/2002 | Takada ............................ 455/63 |
| 2002/0173336 | A1 | 11/2002 | Ranta et al. |
| 2002/0183013 | A1 | 12/2002 | Auckland et al. |
| 2004/0053620 | A1 | 3/2004 | Garrison et al. |
| 2004/0063438 | A1 | 4/2004 | Hsu et al. |
| 2004/0127214 | A1 | 7/2004 | Reddy et al. |
| 2004/0137947 | A1* | 7/2004 | Nimmo-Smith .............. 455/561 |
| 2005/0147079 | A1 | 7/2005 | Lakkis |
| 2005/0233710 | A1 | 10/2005 | Lakkis et al. |
| 2006/0246909 | A1 | 11/2006 | Petermann |
| 2007/0222701 | A1* | 9/2007 | Yoon et al. ..................... 343/895 |
| 2008/0043653 | A1 | 2/2008 | Lakkis |
| 2008/0043654 | A1 | 2/2008 | Lakkis |
| 2008/0049652 | A1 | 2/2008 | Lakkis |
| 2008/0056186 | A1 | 3/2008 | Lakkis |
| 2008/0062921 | A1 | 3/2008 | Lakkis |
| 2008/0232305 | A1 | 9/2008 | Oren et al. |
| 2009/0067383 | A1 | 3/2009 | Fleming et al. |
| 2009/0284440 | A1 | 11/2009 | Weidmann et al. |
| 2010/0159858 | A1* | 6/2010 | Dent et al. ..................... 455/131 |
| 2010/0311353 | A1 | 12/2010 | Teillet et al. |
| 2011/0053646 | A1 | 3/2011 | Kundmann et al. |
| 2011/0053648 | A1 | 3/2011 | Gustaf |
| 2011/0158114 | A1 | 6/2011 | Novak et al. |
| 2011/0286473 | A1 | 11/2011 | Currivan et al. |
| 2012/0008510 | A1 | 1/2012 | Cai et al. |
| 2012/0039603 | A1 | 2/2012 | Wiegner et al. |
| 2012/0176907 | A1 | 7/2012 | Hartenstein et al. |
| 2012/0235872 | A1 | 9/2012 | Lewis et al. |
| 2012/0328036 | A1* | 12/2012 | Chang ........................... 375/267 |
| 2013/0142281 | A1* | 6/2013 | Hastings et al. .............. 375/296 |
| 2013/0272217 | A1 | 10/2013 | Negus et al. |

OTHER PUBLICATIONS

U.S. Appl. No. 14/030,959, amended claims submitted on Mar. 19, 2014, pp. 2-8.*
U.S. Appl. No. 13/836,081 (Unpublished).
Non-Final Office Action dated Jan. 28, 2014 from child U.S. Appl. No. No. 14/034,431, 15 pages.
International Search Report and Written Opinion issued on Nov. 15, 2013 in International Application No. PCT/US2013/051884.
U.S. Appl. No. 13/836,081, filed Mar. 15, 2013.
Office Action issued in U.S. Appl. No. 13/836,081 on Nov. 15, 2013.
Office Action issued in U.S. Appl. No. 14/030,959 on Dec. 19, 2013.
Non-Final Office Action dated Jan. 28, 2014 from child U.S. Appl. No. 14/034,431, 15 pages.
Notice of Allowance dated Feb. 27, 2014 from related U.S. Appl. No. 13/836,081, 9 pages.
U.S. Appl. No. 14/030,959, filed Sep. 18, 2013.
International Search Report and Written Opinion issued on Oct. 10, 2013 in International Application No. PCT/US2013/052072, 11 pages.
Final Action dated May 23, 2014 from U.S. Appl. No. 14/030,959, 17 pages.
Final Office Action dated Jul. 18, 2014 from U.S. Appl. No. 14/034,431, 18 pages.

* cited by examiner

SIMULTANEOUS BIDIRECTIONAL TRANSMISSION FOR RADIO SYSTEMS

CROSS-REFERENCE TO RELATED APPLICATIONS

This application claims the benefit of priority of U.S. Provisional Patent Application Ser. No. 61/676,269 entitled "Simultaneous Bidirectional Transmission for Radio Systems," to Charles Bowman and Behzad Moeenziai, filed Jul. 26, 2012, and claims the benefit of priority to U.S. Provisional Patent Application Ser. No. 61/676,263 entitled "Transmitter for Point-to-Point Radio System," to Charles Bowman and Behzad Moeenziai, filed Jul. 26, 2012. Priority of the filing date of Jul. 26, 2012 is hereby claimed, and the disclosures of the above-referenced patent applications are hereby incorporated by reference. This application is related to U.S. patent application entitled "Transmitter for Point-to-Point Radio System" to Charles Bowman and Behzad Moeenziai, filed on Mar. 15, 2013, which is incorporated by reference.

FIELD OF THE INVENTION

The subject matter of this disclosure relates to data communications and, more particularly, to simultaneous bidirectional transmission for radio systems.

DESCRIPTION OF THE RELATED ART

As the need for the transmission of voice, video, and data have constantly escalated with the increasing use of wireless access devices, the importance of maximizing the utilization of radio frequency (RF) spectrum has increased sharply. In the initial stages of the growth, significant impact on efficient spectral use was accomplished by increasing the complexity of the transmitted data symbols where increasing the number of bits in a symbol was practical and provided a meaningful increase in the amount of data that could be carried by any assigned bandwidth. That process has led to complex symbols. As such, practical iterative steps now increase transmitted data by a relatively low percentage, with much of that gain removed by the insertion of non-payload data that is needed to identify and correct the increasing level of errors that are more prevalent with the complex symbols. Accordingly, large increases in spectral efficiency now demand finding and using new means of exploiting the spectrum.

SUMMARY

Embodiments disclosed herein are directed to methods, systems, and apparatus for maximizing the spectral efficiency of a communications spectrum by providing a means to transmit voice, video, and data information continuously and simultaneously in both directions of a radio link at any given time on a single center frequency, bandwidth, radiation polarity, and spatial corridor. Accordingly, the embodiments described herein simultaneously transmit and receive two signals using the same center frequency, bandwidth, and radiation polarity, in the opposing directions along the same special corridor, thereby doubling the spectral efficiency. The efficiency is increased (e.g., doubled) for a FDD system by either carrying the same amount of data on the allocated bandwidth of only one of the two center frequencies or by carrying twice the amount of data by transmitting in both directions simultaneously on the allocated bandwidths of both assigned frequencies. The efficiency for a TDD system is increased proportionally to the ratio of time allocated for data in the two directions, and in systems with equal upstream and downstream time slots the efficiency may be doubled, by allowing continuous simultaneous transmission in both directions rather than dividing the time between the two.

In accordance with this disclosure, one embodiment may be directed to a method of communicating in a point-to-point radio system. The method may include receiving a first signal at a first antenna of a first radio head, and transmitting a second signal from a second antenna of the first radio head. The first signal may include a transmitted data signal from a distant second radio head and interfering signals from the transmitted signal from the second antenna of the first radio head. The method continues by determining a correction signal from a transmitter of the first radio head and processing the first signal to remove the interfering signals using the correction signal. The first and second signals may be on the same center frequency and operating bandwidth and sent and received at substantially the same time.

In another aspect, the method may further include receiving a third signal at a third antenna and transmitting a fourth signal from a second transmitter and fourth antenna of the radio head. The third signal may include a second transmitted data signal from a distant second radio head and second interfering signals from the transmitted signals of the fourth antenna of the radio head. The method continues by determining a second correction signal from the second transmitter of the first radio head and processing the third signal to remove the second interfering signals using the second corrections signal. The third signal may have an orthogonal polarization from the first signal and the fourth signal may have an orthogonal polarization from the second signal. The first signal, the second signal, the third signal, and the fourth signal may be on the same center frequency and operating bandwidth and sent and received at substantially the same time.

In another aspect, a radio head may comprise a receiver coupled to a first antenna, a transmitter coupled to a second antenna, and a processor coupled to the transmitter and the receiver. The processor is configured to perform a method including receiving a first signal from the first antenna, wherein the first signal includes a transmitted data signal and interfering signals, determining a correction signal from the transmitter, processing the first signal to remove the interfering signals using the correction signal, and sending a second signal using the second antenna, wherein the first and second signals are sent and received at substantially the same time.

In another aspect, a master radio head may comprise a receiver coupled to a first antenna and a transmitter coupled to a second antenna. Additionally, the master radio head comprises a processor coupled to the transmitter and the receiver. The processor is configured to perform a method. The method comprises receiving a first signal from the first antenna, wherein the first signal includes a transmitted data signal and interfering signals from the transmitted signals of the first antenna, determining a correction signal from the transmitter, processing the first signal to remove the interfering signals using the correction signal, and sending a second signal using the second antenna. The processor may divide the transmitted second signal into time slots intended for reception by different distant slave radio heads and encode the transmitted signal to identify the data intended for each remote radio head, and process the received first signal to analyze it for encoded signals to separate the signal into separate signals from each slave radio head. The first and second signals may be on the same center frequency and operating bandwidth and sent and received at substantially the same time.

Other features and advantages of the disclosure may be apparent from the following description of the embodiments, which illustrate, by way of example, the principles of the present disclosure.

DETAILED DESCRIPTION

Figure 1:
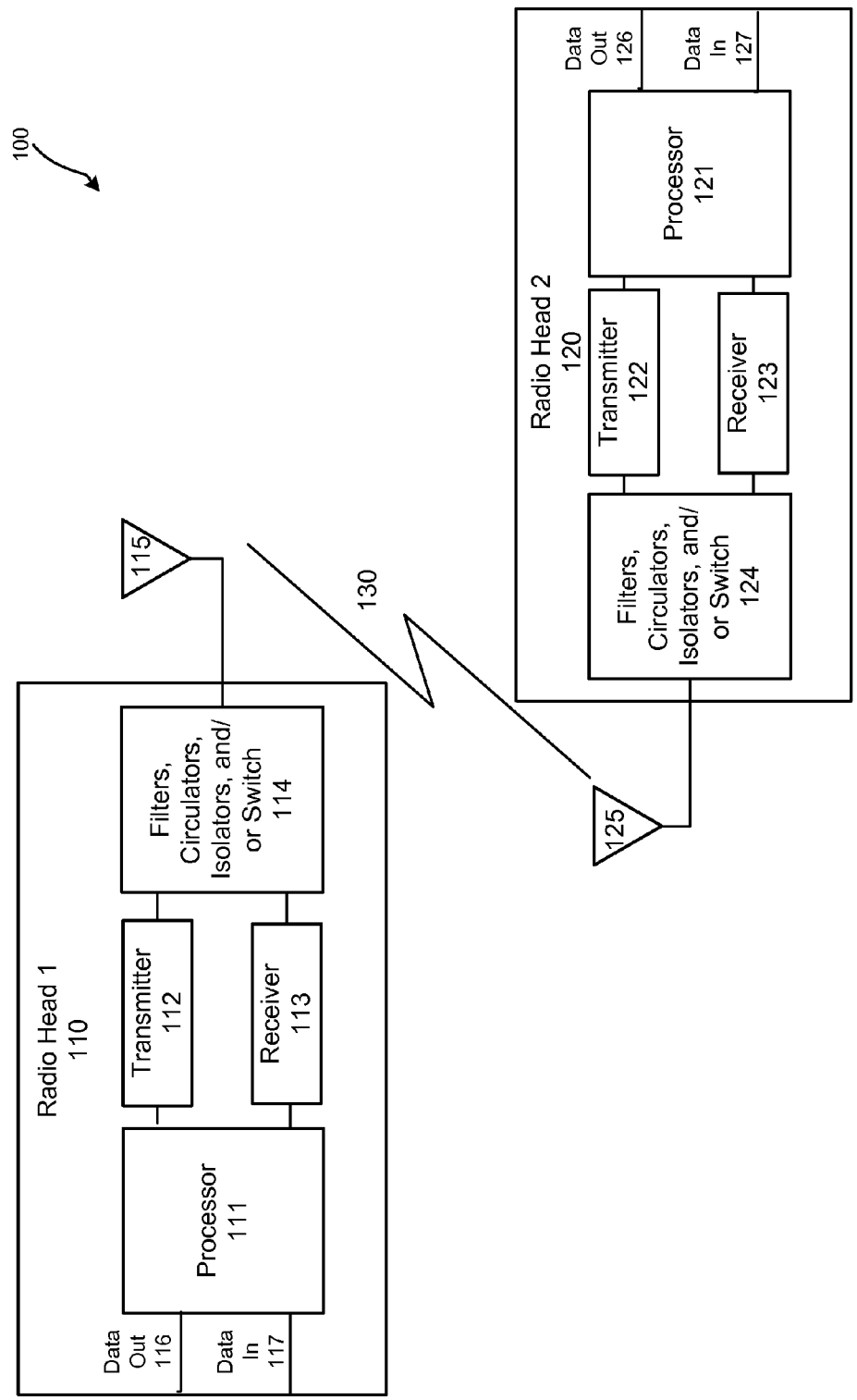
FIG. 1 is a high level block diagram of a prior art point-to-point radio system.

Embodiments disclosed herein are directed at methods, apparatus, and systems that provide a means to transmit voice, video, and data information continuously in both directions of a radio link at any given time on an assigned center frequency, bandwidth, radiation polarity, and spatial corridor. Present embodiments described herein generally either share time to send the signals in two directions on a single frequency, or send the signals in the two different directions using separate frequencies or separate radiation polarities, or use a combination of both separate frequencies and separate radiation polarities.

As the need for the transmission of voice, video, and data have constantly escalated with the increasing use of wireless access devices, the importance of maximizing the utilization of radio frequency (RF) spectrum has increased sharply. In the initial stages of the growth, significant impact on efficient spectral use was accomplished by increasing the complexity of the transmitted data symbols where increasing the number of bits in a symbol was practical and provided a meaningful increase in the amount of data that could be carried by any assigned bandwidth. That process has led to complex symbols, with practical iterative steps now increasing the transmitted data by a relatively low percentage, with much of that gain removed by the insertion of non-payload data that is needed to identify and correct the increasing level of errors that are more prevalent with the complex symbols. Large increases in spectral efficiency now demand finding and using a new means of exploiting the spectrum, such as the concept described herein for simultaneously using existing spectrum to pass multiple signals.

An important step in increasing the data capacity of a radio link has been the use of dual radiation polarizations where independent data is sent in two separate signals from each end of a radio link to the other, with the principal implementations using the same frequency for both signals in one direction of the link while a second frequency is used to send both returning signals in the opposite direction as the first. This is typically accomplished by sending the signals on orthogonal polarizations where the antenna and coupling components, such as an ortho-mode transducer (OMT), can separate the two signals into distinctly different signals and route those to different transmitters and receivers. While both of the received signals contain components of both polarities, the antenna and or OMT isolation allows adequate differentiation between the wanted and unwanted signals to allow further removal of interference by using signal processing techniques to further distinguish the desired signal from the unwanted cross polar component. This process is most often referred to as the Cross Polarization Interference Cancellation (XPIC) process. This method of signal processing is used to correct the signals by using the best signal from each received signal polarity to subtract the unwanted interference from the other received signal where it appears as the interference component. XPIC effectively doubles the amount of data by sending the two signals across a single frequency in the same direction, but it also uses a second communications channel, as the separate polarizations are assigned as separate channels, that could also be utilized for other purposes.

Embodiments of the present invention allow the transmission of signals in both directions on a single polarity. Additionally, embodiments double the amount of data that can be carried in either direction, thereby cutting the frequency bandwidth in half for the same amount of data, or sending twice the data over the same amount of bandwidth if both assigned frequencies are utilized. In either case, the spectral efficiency is doubled, allowing twice the data to be carried over any assigned channel, whether that channel contains a single frequency or a related pair of frequencies.

Embodiments of the present invention use separate transmit and receive antennas with high port-to-port isolation (i.e., high isolation antennas) to enable independent transmit and receive air interfaces that do not require the filtering or coupling components used in radios configured for the common use of a single antenna by the transmitter and receiver functions. As with embodiments implementing dual polarity, the radio heads in this embodiment may have some unwanted signal content (i.e., interfering signals) added through either leakage of a transmitter of the radio heads into the receiver input port or reflections of a transmitted signal back to the receiver port where the interfering signals is added to the desired signal (i.e., transmitted data signal) which occupies the same spectral space. In some embodiments, the principal leakage path may be the coupling between the antennas, and may be processed similarly to the XPIC process to optimize performance. The concept can be used in conjunction with XPIC techniques to exploit the advantages of both, and in such a case may carry an aggregate of approximately four times the data of a single-polarity single-frequency channel.

Typical licensed and unlicensed point-to-point and point-to-multipoint radio systems transmit in a single direction at any given time on an assigned center frequency, bandwidth, radiation polarity, and spatial corridor. These systems accomplish data flow in both directions by either Frequency Division Duplexing (FDD) or Time Division Duplexing (TDD). Systems implementing FDD assign two separate center frequencies, spaced apart by some transmit to receive frequency difference (TR), to a communication channel along with equal bandwidths to provide the path for information to flow separately in each direction. Systems implementing TDD assign a single center frequency and bandwidth and the data traffic is allowed to flow in a single direction at any given time. Equal or unequal percentages of time may be assigned to data flow in each direction. In a TDD system, spectral efficiency is typically reduced by assigning a portion of the data flow time, to allow the switching process to occur without losing data during the transition between transmit and receive modes. However, in both FDD and TDD systems, the use of the assigned spectrum is limited to a maximum efficiency of 50%, as data in such systems flows in only one direction at any given time over the assigned spectrum, radiation polarity, and spatial corridor; and the maximum efficiency may be less than 50% in the case of TDD systems.

FIG. 1 shows a typical prior art point-to-point radio system 100 comprising a first radio head 110 configured to communicate 130 with a second radio head 120. The second radio head 120 may be identical to the first radio head 110. FIG. 1 shows a point-to-point radio system that may communicate in both directions of the radio link simultaneously using either FDD or TDD. For example, in typical FDD point-to-point radio systems, the transmit circuits (i.e., transmitter) 112 and receive circuits (i.e., receiver) 113 of a radio head 110 may be connected to a common antenna 115 and these circuits 112, 113 may be isolated from each other by either a set of filters 114 or a combination of filters, circulators, and/or Isolators 114 which connect the transmitter 112 and receiver 113 to the antenna 115, yet electrically separate (i.e., electrically isolate) the transmitter 112 and receiver 113 from each other. The isolation between the receiver 113 and transmitter 112 of each radio is needed for two reasons: (1) prevention of damage or reduced function of the receiver from the high RF power levels in the frequency range being transmitted by the transmitter 112, and (2) desensitizing the receiver 113 by noise coming from the transmitter 112 in the frequency range of the signal 130 desired to be received by the receiver 113.

Electrical isolation is needed between the transmitter 112 and receiver 113 to prevent the high level of power from the transmitter 112 from reaching the sensitive circuits of the receiver 113 and either desensitizing or damaging those receiver circuits 113. The isolation needed to prevent the loss of receiver sensitivity or circuit damage may be accomplished by a combination of circulators and isolators 114 which allow most of the energy entering the transmitter port 112 of the network to pass in one direction to a common antenna port 115, and allow received energy from the antenna port 115 to pass to the receiver 113, while somewhat blocking energy flow directly from the transmitter 112 to the receiver 113; or by filters 114 between the common antenna port 115 and the transmitter 112 and receiver 113 ports which allow transmitted power in the transmit frequency range to reach the antenna 115 and received information in the receiver frequency range to reach the receiver 113, but blocks essentially all of the energy coming from the transmitter 112 from reaching the receiver 113.

In practice, the use of circulators or isolators alone may create a high loss to wanted signal flow and may provide a limited amount of isolation where needed. Therefore, even with the use of these broader frequency components, some filtering is commonly used, and these filters typically limit the frequency range over which both the transmitter and receiver can operate, and prevent the use of both on the same frequency. A processor 111 may control the operation of the radio head 110 as well as process the received data signals, transmitted data signals, data input 117, and data output 116.

For TDD systems, a switch 114 with high isolation connects the antenna 115 alternately to the transmitter 112 and receiver 113 and the basic operation prevents both from operating at the same time. A processor 111 may control the switch 114 as well as process the received data signals, transmitted data signals, data input 117, and data output 116.

Figure 6:
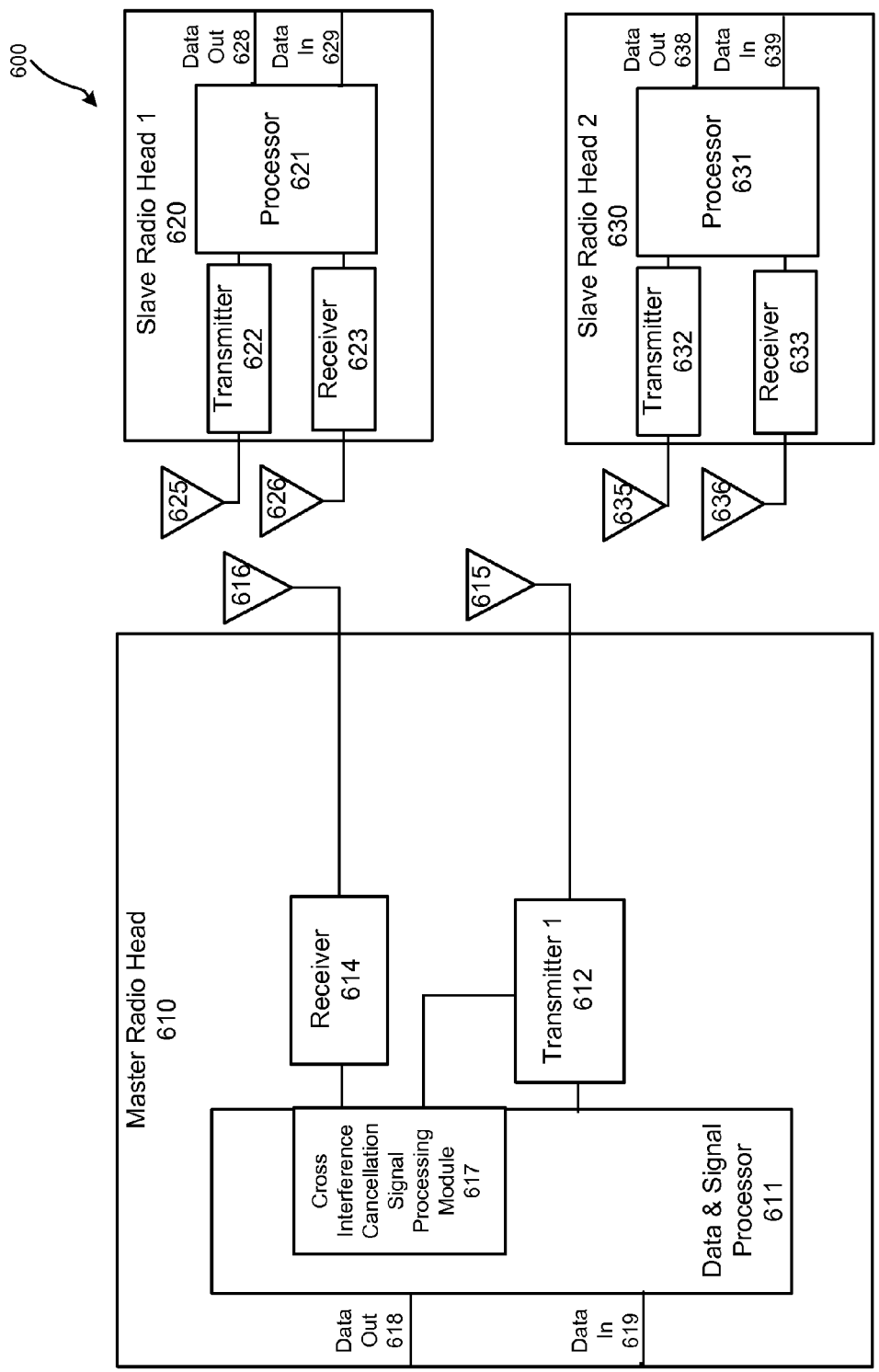
FIG. 6 is a block diagram of a point-to-multipoint radio system, according to one embodiment of the present invention.

Embodiments of the present invention provide a means to allow transmission of information in both directions simultaneously at any given time on a single assigned center frequency, bandwidth, radiation polarity, and spatial corridor; such as assigned to TDD systems; or over both of the assigned center frequencies, bandwidths, and radiation polarity of the spatial corridor; such as used in FDD systems. Embodiments therefore use one-half of the assigned bandwidth to carry the same data; or alternatively, double the amount of data that can be carried on the assigned spectrum, radiation polarity, and spatial corridor. In both cases, the spectral efficiency of the radio link is, as a practical minimum benefit, doubled. Embodiments of the present invention include licensed band or unlicensed band Point-to-Point (PtP) radio systems (as shown in FIG. 2) and Point-to-Multi-Point (PmP) radio systems (as shown in FIG. 6).

Figure 2:
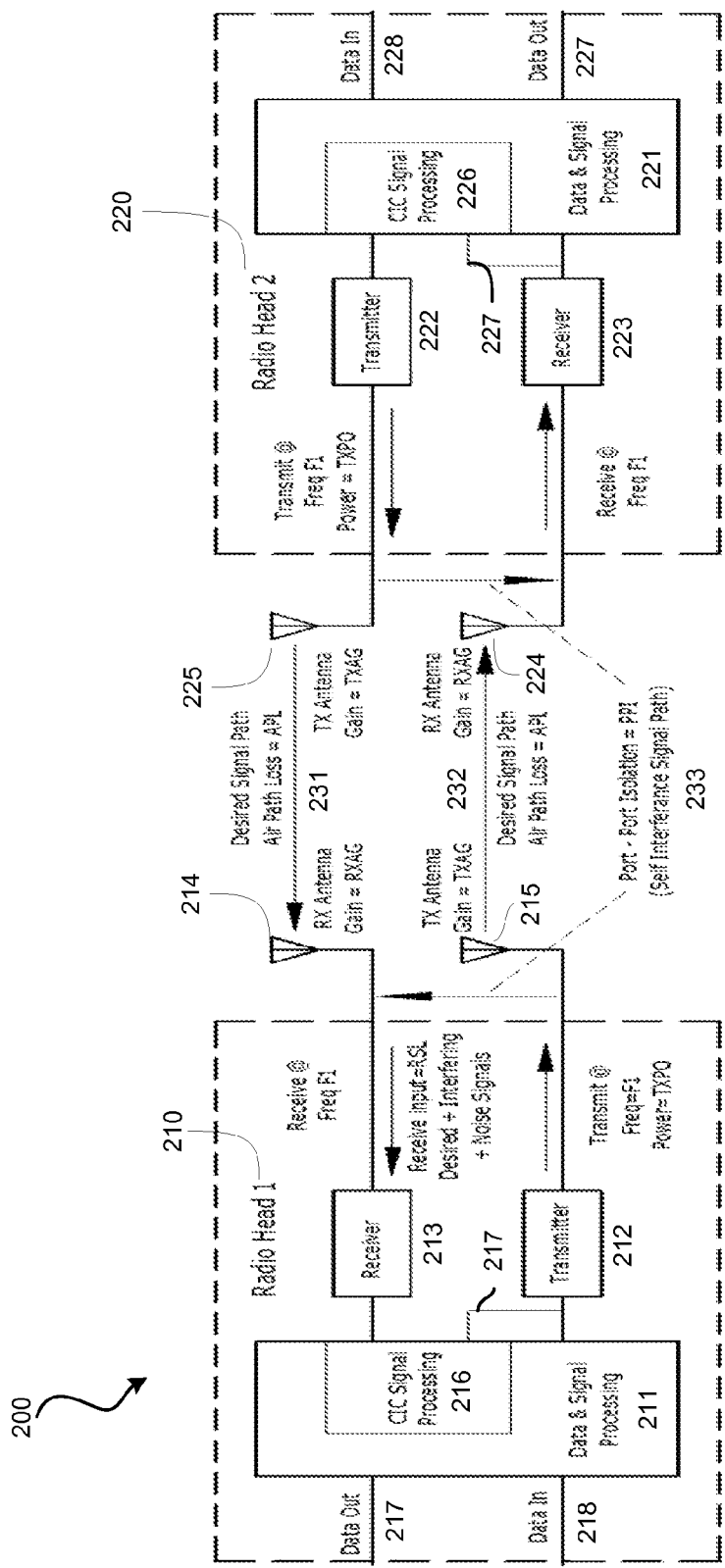
FIG. 2 is a block diagram of a radio system transmitting in both directions on the same frequency, according to one embodiment of the present invention.

FIG. 2 shows an exemplary block diagram of a basic point-to-point radio communication system 200 according to an exemplary embodiment of the present invention. The point-to-point radio communication system 200 comprises a first radio 210 including multiple antennas 214, 215 configured to communicate using signal paths or links 231 and 232 with a second radio head 220 comprising multiple antennas 224, 225. The first radio head 210 may comprise a receiver 213 coupled to a first antenna 214 configured to receive signals 231 from a second radio head 220, a transmitter 212 coupled to a second antenna 215 configured to transmit signals 232 to a second radio head 220, and a processor 211 coupled to the transmitter 212 and the receiver 213. The data and signal processor 211 may include a co-channel interference cancellation (CIC) signal processing module 216 configured to remove interfering signals, whether coupled directly from the transmit antenna 215 or a reflection from an object near the signal path of transmitted signal 232 back into the signal path of received signal 231, from received signals 231 by determining correction signals 217 from the transmitter 212 and removing the interfering signals using the correction signal 217. The second radio head 220 may be identical to the first radio head 210.

Embodiments of the present invention allow data to be sent in both directions on a single frequency through the use of an array of two or more antennas at each end of the radio link (e.g., at each radio head), with the selection of antennas taken from those which exhibit a high level of isolation 233 between the ports of the antennas when mounted in close proximity (e.g., the receive antenna 214 and transmit antenna 215 of the first radio head 210). A separate transmit antenna 215 and receive antenna 214 may be used at each end by the transmitter and receiver, respectively, at each end of the radio link. For example, in the first radio head 210, the high isolation antennas 214, 215 limit the amount of interfering energy from the transmitter 212 from entering the input port of the receiver 213. As the receiver 213 of the first radio head 210 may receive relatively weak levels of transmitted energy from the transmitter 222 of the second radio head 220, the isolation 233 between antennas 214, 215 at the same end may significantly reduce the amount of interfering energy entering the receiver port 212 from the much higher power level of the signal 232 coming from the nearby transmitter 213 to a level well below that coming from the far end 231.

The antenna isolation 233, and the resulting level of unwanted signal getting through to the receiver 213, may typically limit the useable distance of a radio link, in most cases to a value less than achievable in a system using separate frequencies or times. However, by using the extremely high port-to-port isolation characteristic of adjacent antennas 214, 215 from certain antenna architectures it becomes possible to limit the amount of interference 233 from an adjacent transmitter 212 to a point that allows high levels of performance from the nearby receiver 213, and results in meaningful link ranges with equal performance to existing embodiments for many applications. These antenna architectures may include antennas which feed the radiating aperture from behind the aperture to the air interface surface, such as a Lensed Horn, Slotted Waveguide Array, Continuous Transverse Stub Array, or a Trough Guide Array. Embodiments of the present invention may include antennas that may be fully integrated into a common structure, closely mounted, or widely separated.

The antenna arrays may be realized by combining existing antenna concepts, available on the market, which exhibit high port to port isolation when mounted in close proximity. Examples of such antennas are Lensed Horns, Waveguide Slot Arrays, Continuous Transverse Stub arrays, and Trough Guide Arrays; with preferred antenna configurations being the smaller geometry antennas configured as a flat plate, such as the Slotted Waveguide Array, Continuous Transverse Stub (CTS) architectures, or Trough Guide Arrays. These combinations may use all antennas of the same type and size or combinations of different types or sizes.

The recovery of the desired signal, in the presence of interfering signals from the nearby transmitter(s), is enhanced by the use of signal processing which subtracts much, or under optimum processing most, of the interfering signal from the sum of signals entering the receiver port. This processing, which is a Co-channel Interference Cancelation (CIC) process, is possible with high accuracy, as the interfering signal is known and available to the receiver and signal processing circuits and algorithms.

Any signal from the nearby transmitter that enters the receiver port may be added to the other signals present at the receiver port, including noise, other interfering signals, and the desired signal coming from the far end of the link. The ability of a receiver to separate the desired signal from unwanted energy within the passband of interest is degraded to some extent by any added interfering signal and may be at its best when only a desired signal enters the receiver port degraded only by ambient thermal noise and the noise generated within the receiver, and the usable range over which any radio link may be the greatest under these conditions.

However, the extremely high port-to-port isolation of the adjacent antennas, when implemented as in embodiments of the present invention, makes it possible to limit the amount of interference from an adjacent transmitter to a level that allows high levels of performance from the nearby receiver and results in meaningful link distances with equal performance to existing embodiments for many applications. The recovery of the desired signal (i.e., transmitted data signal), in the presence of interfering signals from the nearby transmitter, is enhanced by the use of Co-channel Interference Cancellation (CIC) signal processing which subtracts much, or under optimum processing most, of the interfering signal from the sum of signals entering the receiver port. The CIC correction processing is possible with high accuracy, as the interfering signal is known (from the transmitter of the radio head), may have specific identifying data added to the signal to enhance identification, and is available to the receiver and signal processing circuits and algorithms of the radio head.

Figure 3:
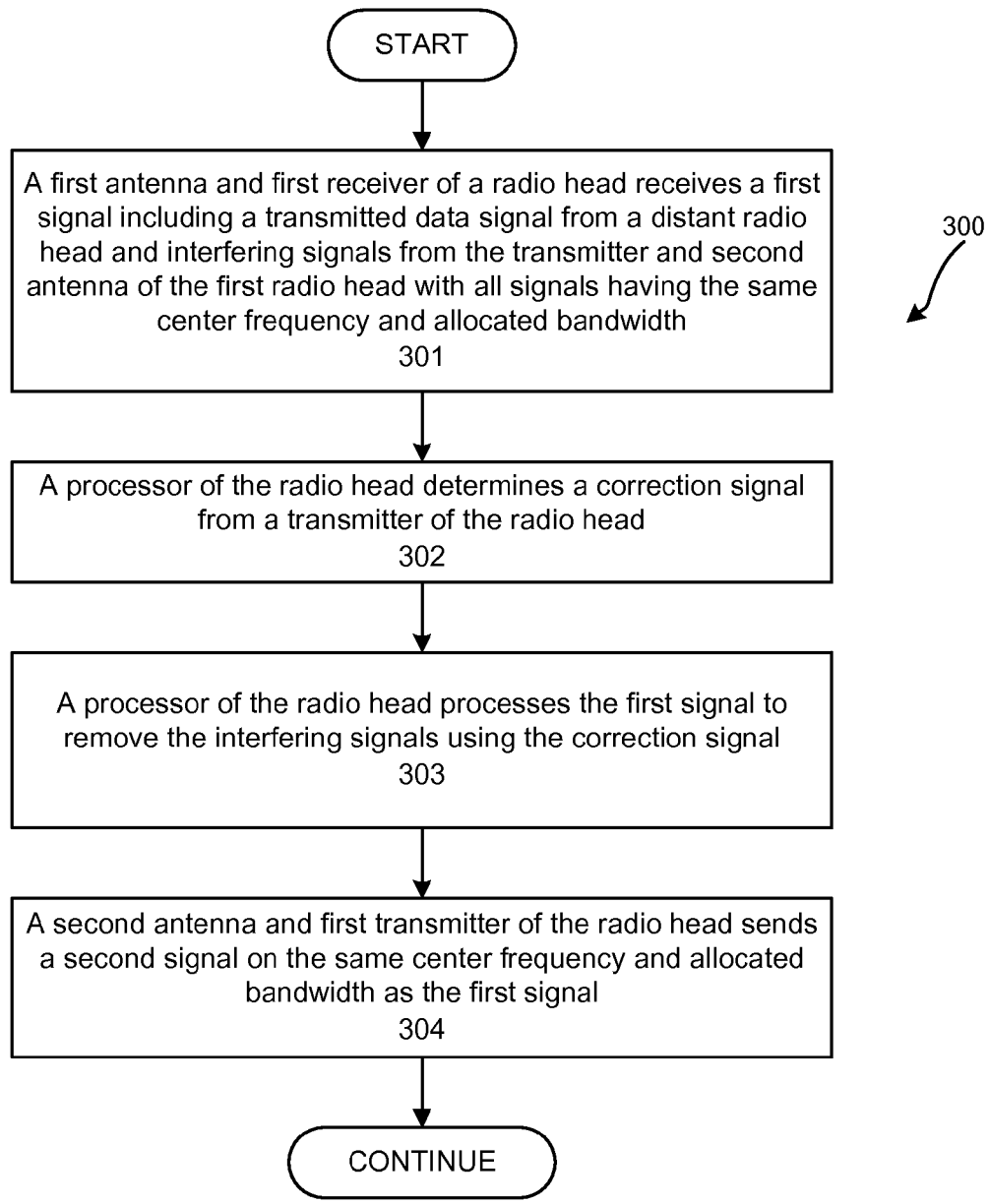
FIG. 3 is a flowchart of a method for performing simultaneous bidirectional transmission in a point-to-point radio system, according to one embodiment of the present invention.

The CIC correction process is significantly different from the Cross Polarization Interference Correction (XPIC) process used to remove similar distortions resulting from the reception of two cross-polarized signals sent from each end of the link to the other and received by two independent receivers. In XPIC systems the desired signal for each of the two receivers is greater than the interfering signal as a result of the antenna and feed system separating the signals based on their polarization even though they are transmitted at essentially the same signal levels. Unlike the XPIC processing that uses each receiver to provide the cancellation signal source for the other receiver, with a signal (the unwanted cross polarized component) which is itself distorted, to correct the desired signal, the CIC processing uses a correction signal that is undistorted, as the signal source is generated on the same end of the link as the CIC correction process using it, with the essentially undistorted signal coming from transmit circuitry nearby the receiving circuits. In typical applications XPIC processing techniques require that the desired polarity signal be the largest signal entering the receive path to enable separating it from the undesired cross polarized signal. While the CIC processing takes advantage of the knowledge of the interfering data made possible by the adjacent signal source to more precisely separate the unknown desired signal information from the known interfering information, which may also be random, but known, or may have identifying characteristics added to enhance the ability to separate and extract it from the desired information. As a result, the undesired interfering signal from the radio head transmitter may be extracted from the total signal entering the receiver even though, as may happen with reflected signals from nearby obstacles, it may be as great or even greater than the desired signal FIG. 3 shows a flowchart of a method 300 for performing simultaneous bidirectional transmission in a point-to-point radio system, according to one embodiment of the present invention. The method may be performed by systems implementing TDD or FDD or both. The method may also be performed by systems not implementing TDD or FDD.

In the initial operation of FIG. 3, represented by block 301, a first antenna of a radio head receives a first signal including a transmitted data signal and interfering signals. The transmitted data signal is transmitted from a second radio head that the radio head is configured to communicate with and the transmitted data signal includes the information the second radio head is attempting to send to the radio head. As explained above, the interfering signals may include leakage from a transmitter at the radio head, or the transmitted signal from the radio head, for example, from reflections. The interfering signal may also include noise, ambient thermal energy, or any other energy that may be received at an antenna.

In block 302, a co-channel interference cancellation signal processing module of the radio head determines a correction signal from a transmitter of the radio head. As explained above, the correction signal is determined by using the signal from the transmitter of the radio head. Accordingly, the correction signal may include an essentially undistorted signal coming from transmit circuitry nearby the receiving circuits. Accordingly, the co-channel interference cancellation signal processing module may determine the correction signal by receiving a signal from a transmitter circuit of the radio head.

In block 303, the co-channel interference cancellation signal processing module of the radio head processes the first signal to remove the interfering signals using the correction signal. Processing may include removing or subtracting the correction signal from the first signal to remove the interference signals from the first signal, leaving the transmitted data signal intact. Techniques for such processing will be known to those skilled in the art. Any other suitable method for removing the interfering signals using the correction signal may be implemented.

In some embodiments, the correction signal is determined at least partly by the signal coming from the transmit circuitry multiplied by a gain factor. The gain factor may, for example, be determined with a calibration or characterization process, where a test signal is sent by the transmitter and a power of the test signal received at the first receiver is measured. The power of the test signal received may be used to determine the gain factor.

In block 304, the radio head sends a second signal using a second antenna. The second signal may be sent at substantially the same time as the first signal is received as the system sends and receives signals simultaneously.

In embodiments implementing TDD, the first signal is received and the second signal is sent sequentially.

Alternatively, in embodiments implementing FDD, the first signal may be received at a first frequency and the second signal may be sent at a second frequency. The first frequency and the second frequency may be different and the correction signal for the received signal may be determined using a transmitter configured to operate at the first frequency. Accordingly, the system may comprise a transmitter and receiver for each operating frequency. Accordingly, the method may be expanded to incorporate additional antennas, receivers, and transmitters to incorporate multiple polarizations, frequencies, and/or additional radio heads as will be described in further detail below (e.g., FIGS. 4-7).

The mathematical relationships relating to the signal levels and maximum achievable link operating distance for the point-to-point radio system shown in FIG. 2 are provided below.

For the greatest distance of the link for which the near end receiver can receive the far end signal, the following relationship applies:

$$RSSLT = TXPO + TXAG - APL + RXAG$$

Wherein:
TXPO=Transmitted output power (dBm)
 (Assuming equal transmit power from each end of the link)
TXAG=Transmit antenna gain (dBi)
APL=Air path loss (dB)
 (Assuming equal loss for transmitting both directions over the air path)
RXAG=Receive antenna Gain (dBi)
RSSLT=Receiver threshold (dBm)
 (thermal only without the presence of interference)
 (Minimum received signal power of the signal from the far end transmitter for the receiver to recover the transmitted data)

And, the maximum air path signal loss allowed (maximum distance) for transmission in one direction is:

$$APL = TXPO + TXAG + RXAG - RSSLT$$

For the greatest distance of the link for which the CIC processing can remove a sufficient amount of the interfering signal power from the total received signal to properly recover the desired information, the following relationship applies:

CICT=(Minimum Signal from the far side)−(Interfering signal from the same side)

$$CICT = (TXPO + TXAG - APL + RXAG) - (TXPO - PPI)$$

or $$CICT = TXPO + TXAG - APL + RXAG - TXPO + PPI$$

Wherein:
CICT=Cross Interference Cancelation threshold (dB)
 (Minimum ratio of desired signal to interfering signal for which the CIC processing may recover the wanted information from the total signal); and
PPI=Port-to-Port isolation of the antennas
 (measured at the same end of the link (dB)).

And, the maximum air path signal loss allowed (maximum distance) for transmission in both directions on the same frequency is given by:

$$APL = TXAG + RXAG + PPI - CICT$$

For the proposed concept, both equations may be met for communications between the two ends of the link, which implies that the equation with the lowest path loss may determine the useable distance of the link. Note that the transmit power drops from the relationships describing the path loss for transmission in both directions, which is intuitively correct as (with equal power from the transmitters at each end of the link) increasing transmitted power increases both the signal from the far end and the interfering signal from the near end of the link, therefore leaving the ratio unaffected.

Realistic values for the parameters of the relationships for a range of radio types may include:
TXPO=−10 to +35 dBm
TXAG=25 to 45 dBi
RXAG=25 to 45 dBi
RSSLT=−50 to −80 dBm
CICT=0 dB to +5 dB
PPI=80 to 90 dB From these typical values, operation of a link in one direction can be accomplished with air path attenuation of:

$$\begin{aligned} APL &= TXPO + TXAG + RXAG - RSSLT \\ &= -10 + 25 + 25 + 50 \\ &= 90 \text{ dB} \end{aligned}$$

To:

$$\begin{aligned} APL &= TXPO + TXAG + RXAG - RSSLT \\ &= 35 + 45 + 45 + 80 \\ &= 205 \text{ dB} \end{aligned}$$

From these typical values, operation of a link in both directions can be accomplished with air path attenuation of:

$$\begin{aligned} APL &= TXAG + RXAG + PPI - CICT \\ &= 25 + 25 + 80 - 5 \\ &= 125 \text{ dB} \end{aligned}$$

To:

$$\begin{aligned} APL &= TXAG + RXAG + PPI - CICT \\ &= 45 + 45 + 90 - 0 \\ &= 180 \text{ dB} \end{aligned}$$

Accordingly, air path attenuation in one direction may range from 90 dB to 205 dB and air path attenuation in both directions may range from 125 dB to 180 dB.

It can be seen that for some conditions the minimum levels for transmission in one direction are not met even though the condition unique to transmission in both directions is met, but in some embodiments, the conditions for transmission in one direction must be met for communications to occur. In this case, the transmit power of the link may be increased to the level where the air path loss is equal for the two. In the minimum example above, increasing the transmit power from −10 dBm to +25 dBm brings the air path loss for the one way transmission from 90 dB to 125 dB, which is equal to the maximum air path loss for transmission in both directions. Increasing the power beyond the level needed for the one-way transmission to meet the maximum air path loss of the two-way transmission may not yield a longer transmission distance; unless the link is switched from transmission in two directions to transmission in one direction, which may be done for use in FDD channels where two frequencies are available.

Comments above relating to link distance assume equal environmental conditions, with actual distance varying widely with air path geometry, weather conditions such as rain, operating frequency of the link, and the presence of any non-air materials along the assigned spatial corridor such as trees, hills, or structures.

Additional Embodiments of Point-to-Point Radio Systems

The CIC correction process is significantly different from the Cross Polarization Interference Correction (XPIC) process used to remove similar distortions resulting from the reception of two cross-polarized signals sent from each end of the link to the other and received by two independent receivers. In XPIC systems the desired signal for each of the two receivers is greater than the interfering signal as a result of the antenna and feed system separating the signals based on their polarization even though they are transmitted at essentially the same signal levels. Unlike the XPIC processing that uses each receiver to provide the cancellation signal source for the other receiver, with a signal (the unwanted cross polarized component) which is itself distorted, to correct the desired signal, the CIC processing uses a correction signal that is undistorted, as the signal source is generated on the same end of the link as the CIC correction process using it, with the essentially undistorted signal coming from transmit circuitry nearby the receiving circuits, and the ability to inject identifying information into the data stream allows enhanced identification of the transmitted signal to allow unique recognition of the interfering signal.

While the use of two orthogonal polarities, combined with XPIC processing, to send two independent signals through an assigned spatial corridor using a single assigned frequency and bandwidth also doubles the amount of data traffic carried, it does so at the expense of occupying both radiation polarities which does not effectively double the spectral efficiency as one of the polarities could be used, and often is, by a second radio link; whereas the concept of transmitting in both directions truly doubles the amount of data in a single (one frequency for TDD or two frequencies for FDD) channel. The CIC process can be combined with the XPIC process by transmitting both directions on both polarities of a single frequency in a TDD system or in either one or both of the assigned frequencies for a FDD system along a spatial corridor.

Figure 4:
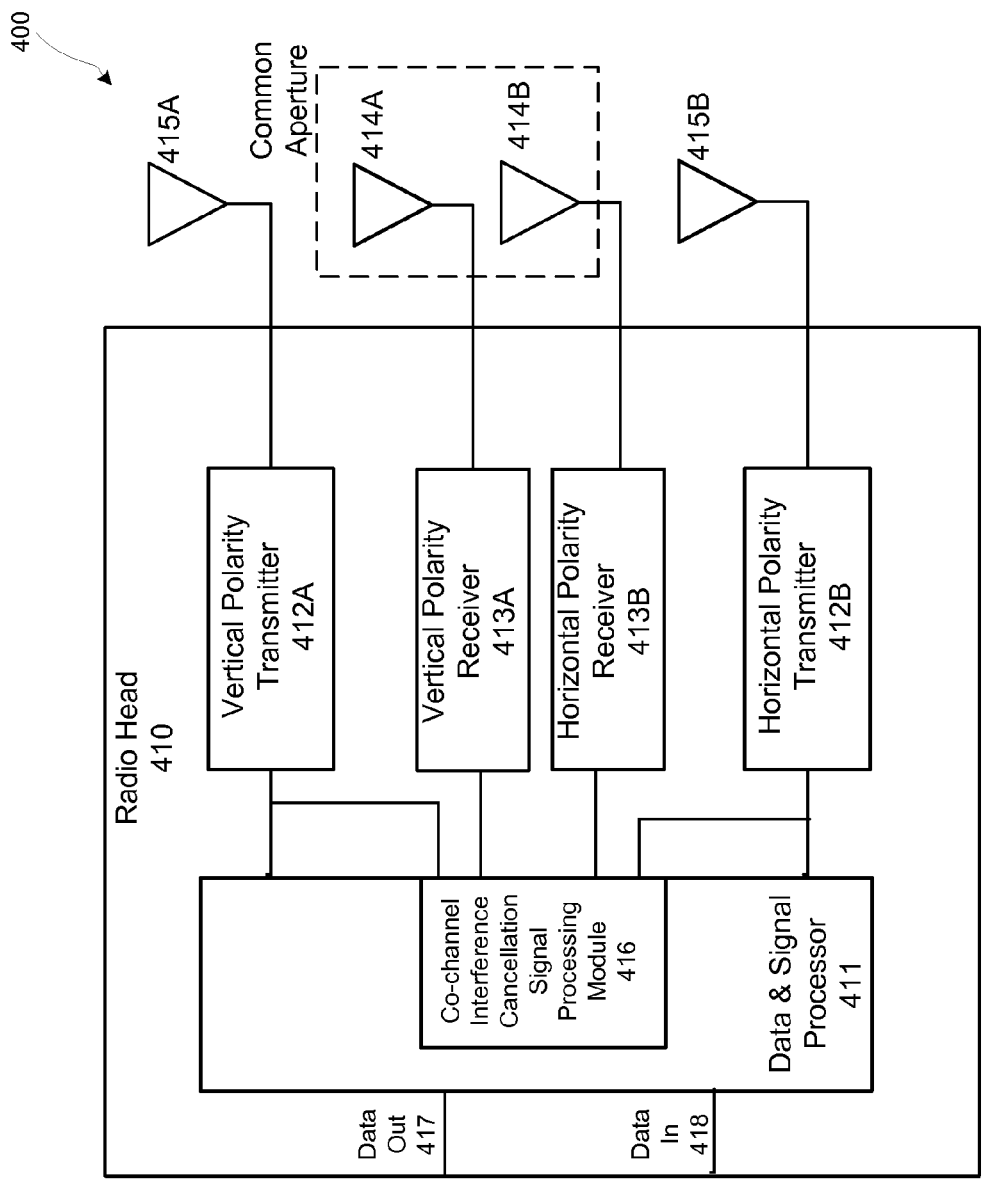
FIG. 4 is a block diagram of a radio head for performing simultaneous bidirectional transmission in a point-to-point radio system on different polarizations, according to one embodiment of the present invention.

FIG. 4 shows an exemplary block diagram of another embodiment of a point-to-point radio communication system 400 according to another exemplary embodiment of the present invention. The point-to-point radio communication system 400 comprises radio heads with multiple antennas that may be used to implement higher throughput systems incorporating transmitters and receivers configured for both vertical and horizontal polarizations.

Additionally, FIG. 4 shows an embodiment where two receive antennas 414A and 414B, which may be used for receivers 413A and 413B, respectively, and two transmit antennas 415A and 415B, which may be used for transmitters 412A and 412B, respectively. The receive antenna 414A and transmit antenna 415A are oriented so as to receive and transmit a vertically polarized signal while the receive antenna 414B and transmit antenna 415B are oriented such as to receive and transmit a horizontally polarized signal. While separate antennas are used for the transmit and receive functions, in some embodiments of the present invention where both signal polarities may be achieved through a single antenna aperture, the same antenna may be used for more than one transmitter or more than one receiver on the same end. For such an antenna capable of interfacing with both polarities, the receive antennas 414A and 414B would be combined into a single aperture and the transmit antennas 415A and 415B would be combined into a single aperture, with the signals from the receivers 413A and 413B connected to the orthogonal ports of the combined receive antenna 414 and the signals from the transmitters 412A and 412B connected to the orthogonal ports of the combined transmit antenna 415. Additionally, more than one antenna may be used for either of the functions while a single antenna is used for the other function, such as two transmit antennas and one common receive antenna to allow two or more separate frequencies to be used in a link such as the assigned channels for FDD use, as shown in the exemplary system of FIG. 4 with the receive antennas 414A and 414B being combined into a single aperture. Accordingly, embodiments may use a single antenna for two or more separate frequencies to limit the size and cost of the radio heads by limiting the number of antennas incorporated into a radio head.

FIG. 4 shows a radio head of a point-to-point radio system incorporating FDD with two sets of transmitters and receivers for separate polarities. The radio head 410 comprises a vertical polarity transmitter 412A and a vertical polarity receiver 413A, a horizontal polarity transmitter 412B, and a horizontal polarity receiver 413B. The vertical polarity receiver 413A may be coupled to a vertical polarity antenna 414A and the horizontal polarity receiver 413B may be coupled to a horizontal polarity antenna 414B. The vertical polarity transmitter 412A may be coupled to a vertical polarity transmitter antenna 415A and the horizontal polarity transmitter 413B may be coupled to a horizontal polarity transmitter antenna 415B. The receive antennas 414A and 414B may be separated or share a common aperture and the transmit antennas 415A and 415B may be separated or share a common aperture.

The radio head 410 also includes a data and signal processor 411, which includes a CIC signal processing module 416. Data and signal processor 411 may be similar to the data and signal processor 210 discussed above. In addition, the CIC signal processing module 416 may be similar to the CIC signal processing module 216 discussed above.

Figure 5:
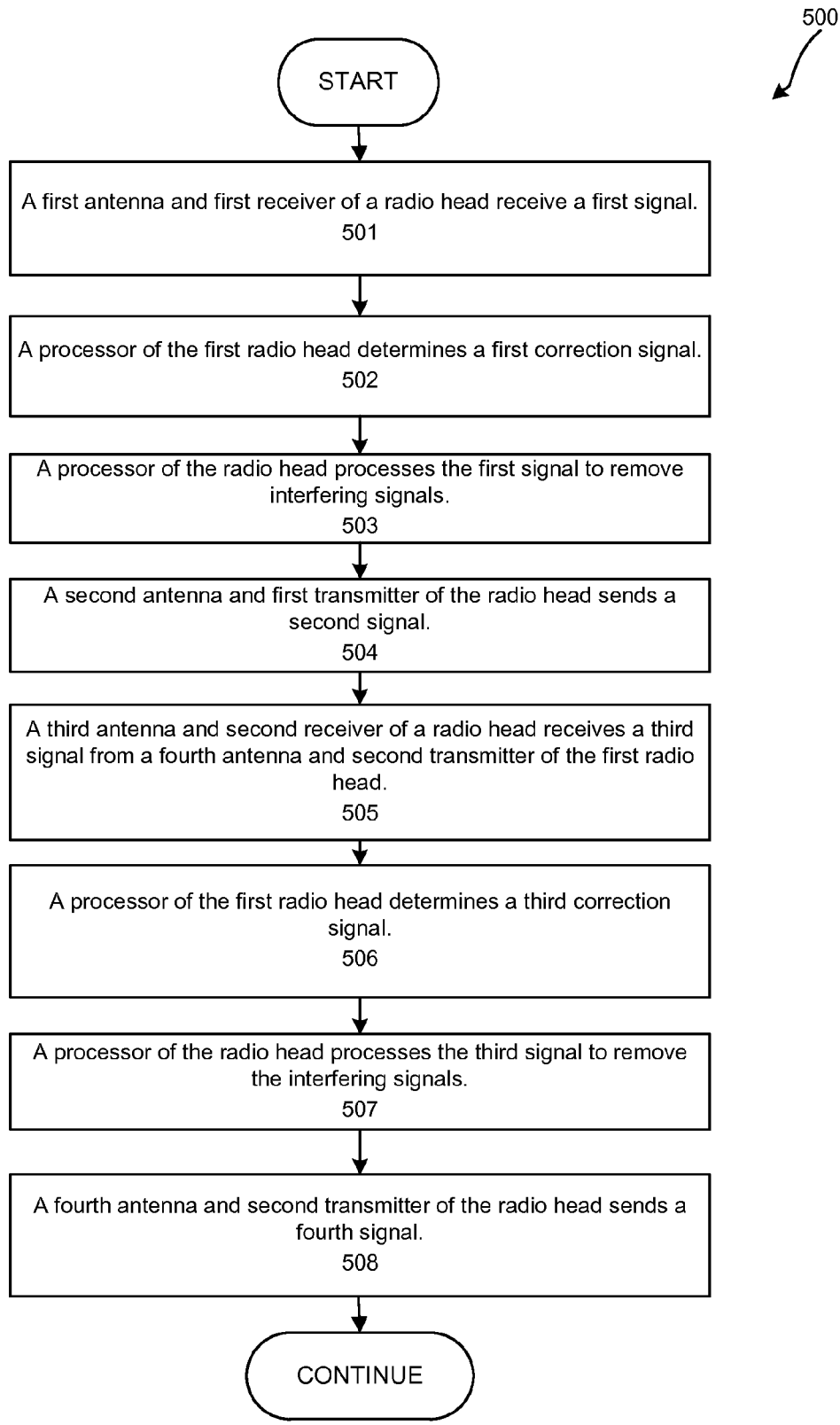
FIG. 5 is a flowchart of a method for performing simultaneous bidirectional transmission in a point-to-point radio system on different polarizations, according to one embodiment of the present invention.

FIG. 5 shows a flowchart of a method for performing simultaneous bidirectional transmission in a point-to-point radio system, according to the above embodiment of the present invention. The method is similar to the method described in FIG. 3 above, but is extended for multiple polarities, antennas, transmitters, and receivers.

In the first FIG. 5 operation, represented by block 501, a first antenna of a radio head receives a first signal including a transmitted data signal and interfering signals. In block 502, the co-channel interference correction signal processor module of the radio head determines a first correction signal from a first transmitter and a second receiver of the radio head. The correction signal contains corrections for both the transmitted signal from the first transmitter of the radio head operating on the same frequency as the receiver, and from the cross-polarized signal intended to be received on the second receiver of the radio head and also on the same frequency as the first receiver. In block 503, the co-channel interference correction signal processor module of the radio head processes the first signal to remove the interfering signals using the first correction signal. In block 504, the radio head sends a second signal using a second antenna. This process is described above in reference to FIG. 3.

However, in blocks 505 to 508, the process is repeated for receivers, transmitters, and signals having an orthogonal polarization from the first transmitter, first receiver, and first signal. Accordingly, the method may include receiving, processing, and sending signals having two different polarities that are orthogonal from each other. For example, at block 505, a third antenna of the first radio head receives a third signal having an orthogonal polarization from the first signal. The third signal includes a second transmitted data signal and second interfering signals.

In block 506, the co-channel interference correction signal processor module of the radio head determines a second correction signal from a second transmitter and the first receiver of the radio head, wherein the second transmitter is configured to operate at an orthogonal polarization from the first transmitter. The polarization of the second transmitter may match the polarization of the second signal such that the correct correction signal is being used for CIC processing. Accordingly, the co-channel interference correction signal processing module may determine which transmitter is associated with the signal being processed and may apply the appropriate correction signal associated with the signal being processed. Accordingly, the CIC processing may occur in separate processors or the process may otherwise be separated such that the signals may be processed correctly as the signals are processed at substantially the same time.

In block 507, the co-channel interference correction signal processor module of the radio head processes the third signal to remove second interfering signals using the second correction signal. Finally, in block 508, the radio head sends a fourth signal using a fourth antenna, wherein the fourth signal has an orthogonal polarization from the second signal. Additionally, all of the signals may be on the same center frequency and sent simultaneously such that the first signal, second signal, third signal, and fourth signal are sent and received at substantially the same time.

While FIG. 5 is directed at a system incorporating transmitters, receivers, and CIC processing for two separate orthogonal polarizations, the method could easily be incorporated for a system incorporating transmitters, receivers, and CIC processing for the same polarization but at different frequencies (e.g., for systems implementing FDD).

Furthermore, additional embodiments may further extend this concept such as by including two transmit antennas for each radiation polarity (four total transmit) and one receive antenna on each polarity (two total receive) to send data through two cross polarized FDD channels using XPIC processing along with the CIC processing. For example, using the method provided above, an extended method may include all of the steps described in reference to FIG. 5 above, occurring at a first frequency, and wherein the method steps are repeated for transmitters and receivers at a second frequency at substantially the same time.

Point to Multipoint Systems

Embodiments of the present invention may also include point-to-multipoint architectures. Point-to-multipoint systems may be implemented with a master radio head and two or more slave radio heads sharing a single frequency using TDD architectures where communications in each direction between the master and any of the slaves is scheduled by time slots in which only one transmits at any given time. In typical point-to-multipoint system, high isolation switches may incrementally connect each of the radio antennas to the transmitter and receiver of that radio head at the proper time. Embodiments of the present invention including point-to-multipoint systems allow point-to-multipoint systems to both transmit and receive simultaneously on the same frequency, effectively doubling the data capacity of the TDD system and eliminating the need for high isolation and relatively high RF power switches. Instead, the systems may gate the transmitters on and off at the proper time through lower power and lower isolation switching mechanisms or other electronic switching means, such as disabling the transmitter carrier through a variety of gating blocks. Accordingly, embodiments of the present invention provide advantages for both point-to-point systems as well as point-to-multipoint systems.

FIG. 6 shows an exemplary embodiment of a point-to-multipoint system 600 according to embodiments of the present invention. The point-to-multipoint system 600 comprises a master radio head 610 and two or more slave radio heads 620, 630. The master radio head 610 comprises a receiver 614 coupled to a first antenna 616, and a transmitter 612 connected to a second antenna 615. The master radio head may further comprise a processor 611 coupled to transmitter 612 and the receiver 614. Transmitter 612 may be configured to communicate with one or more slave radio heads 620, 630 using the second antenna 615. Accordingly, the processor 611 may cause the transmitter 612 to send scheduling information to one or more slave radio head and to send the data traffic to communicate with a particular slave radio head when it is time for communicating with that slave radio head. When it is not a slave radio head's designated time slot or otherwise not time for communicating with the slave radio head, the slave radio head may power down, shut off power, or otherwise disable the particular transmitter associated with that slave radio head. Radio head 610 also includes data and signal processor 611, which includes CIC signal processing module 616. Data and signal processor 611 may be similar to data and signal processor 210 discussed above. In addition, CIC signal processing module 616 be similar to CIC signal processing module 216 discussed above.

Figure 7:
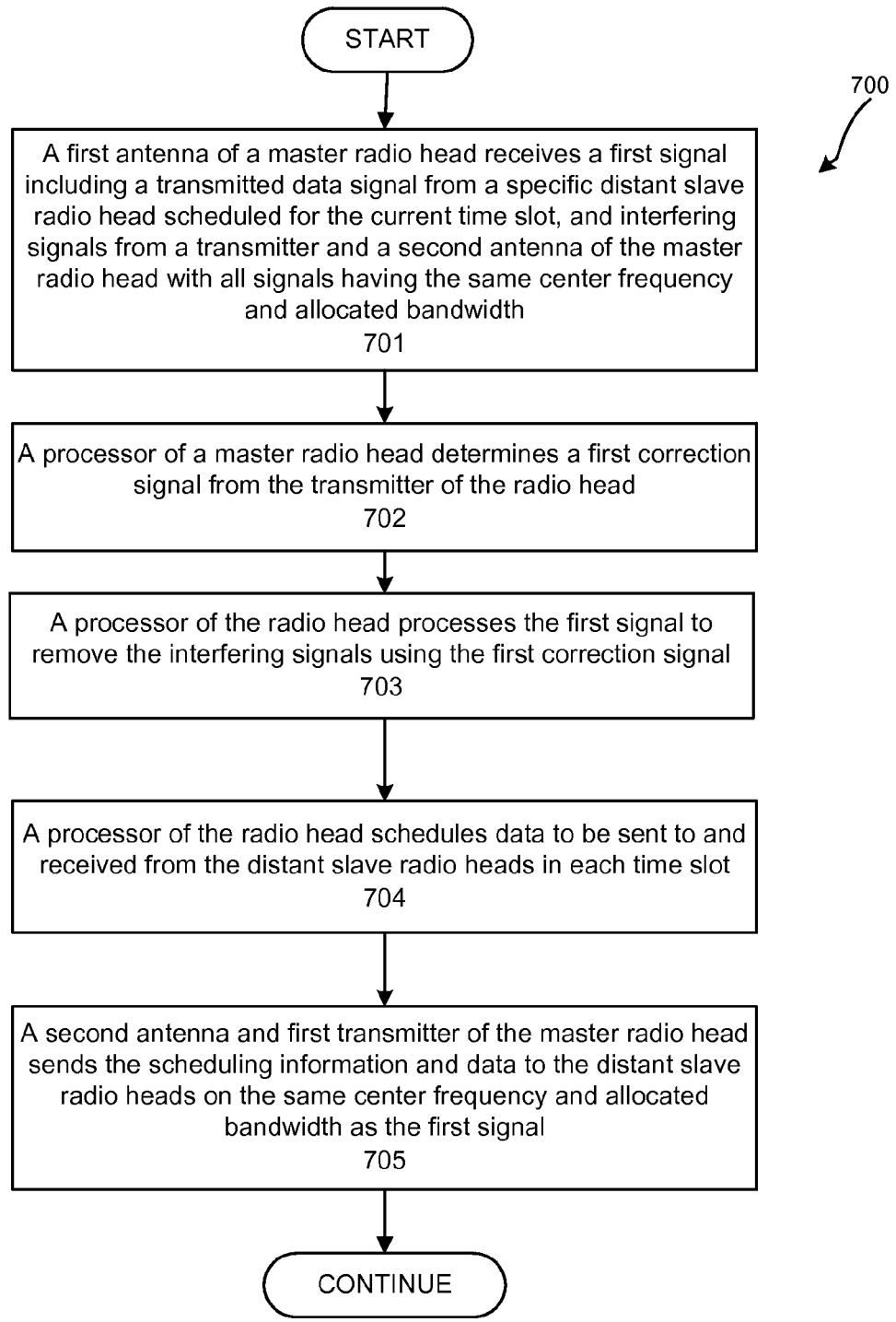
FIG. 7 is a flowchart of a method for performing simultaneous bidirectional transmission in a point-to-multiple point radio system, according to one embodiment of the present invention.

FIG. 7 shows an exemplary flowchart for a method of communicating in a point-to-multipoint radio system, according to embodiments of the present invention. The process is similar to those explained above, however, the Data & Signal Processor 611 may cause the Master Radio Head transmitter to send scheduling and other signals to the remote radio heads to coordinate time slots for communications of each.

In the first operation, represented at block 701, the master radio head receives a first signal from the first antenna. As in other embodiments, the first signal may include a transmitted data signal and interfering signals. In the point-to-multipoint system, a number of different slave radio heads may send transmitted data signals to the master radio head at predetermined time slots. Accordingly, the first signal may be sent from a first slave radio head and the next received signal may be from a second slave radio head. The master radio head may respond to each slave radio head at a predetermined time slot in order to communicate with a particular slave radio head.

At block 702, the processor of the master radio head determines the correction signal from the transmitter coupled to the second antenna at the time of receiving the first signal.

This block may be similar to those described above. Additionally, block 703 may be similar to corresponding blocks in previously described point-to-point systems. At block 703 the master radio head processes the first signal to remove the interfering signals using the correction signal, at block 704, the Processor 611 determines the scheduling of time slots for both transmission of data to and the reception of data from the slave radio heads, and finally at block 705 the radio head sends a second signal using the second antenna at substantially the same time as the first signal is received. The second signal may contain scheduling information for one or more of the slave radio heads and be configured for a particular slave radio head and this process may be repeated for the next time slot associated with a slave radio head associated with the next time slot. Accordingly, a TDD point-to-multipoint system may be implemented in embodiments of the present invention.

Figure 8:
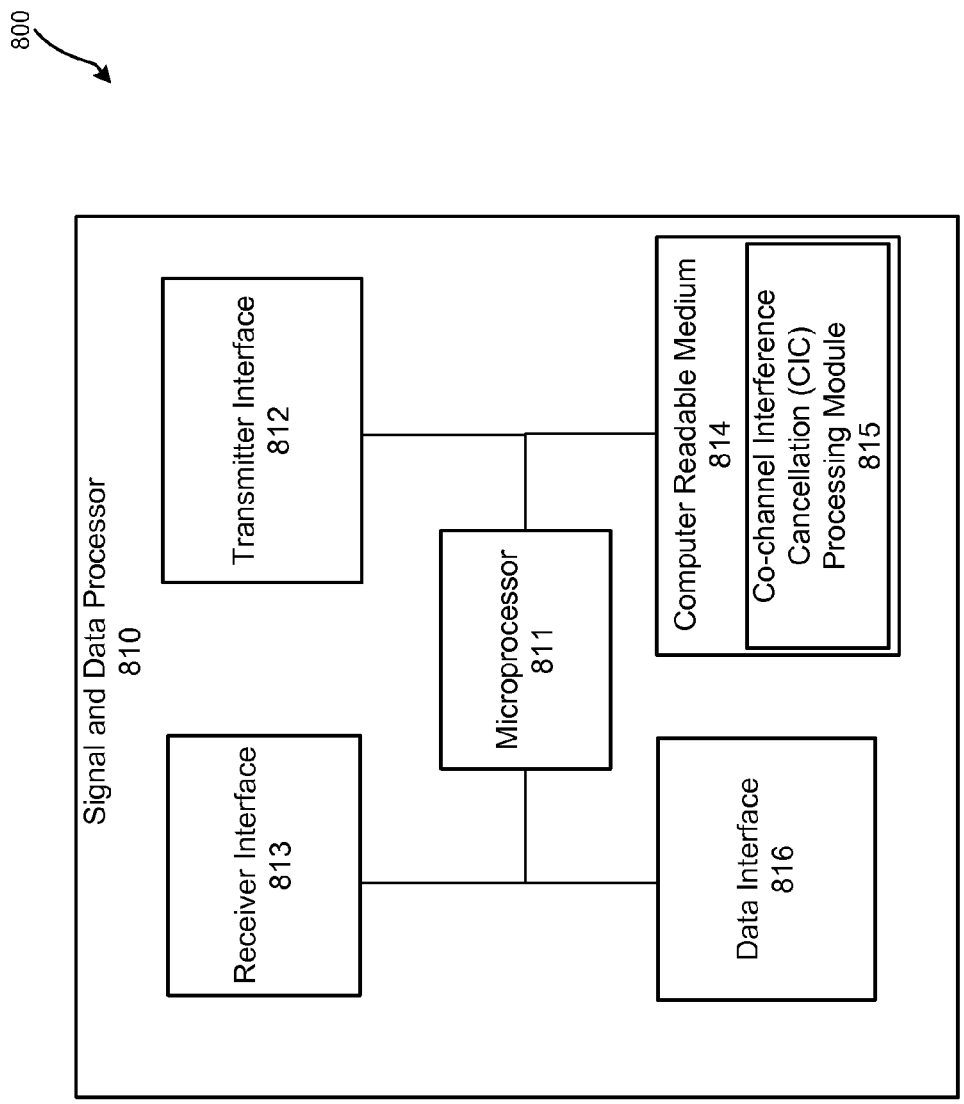
FIG. 8 is a block diagram of an exemplary data and signal processor of a radio head according to exemplary embodiments of the present invention.

FIG. 8 shows a block diagram of an exemplary signal and data processor 810 of a radio head, according to embodiments of the present invention. The processor of FIG. 8 may be implemented in any of the embodiments described above including radio heads shown in FIGS. 2, 4, and 6. The signal and data processor 810 may comprise a microprocessor (i.e., processor) 811, a transmitter interface 812, a receiver interface 813, a computer readable medium 814 including a co-channel interference cancellation (CIC) signal processing module 815 and any other modules that are necessary to process received signals and transmit signals or communications as described herein, and a data interface 816.

The transmitter interface 812 may electrically couple the signal and data processor 810 to one or more transmit circuits of a radio head and subsequently one or more transmit antennas. Additionally, the transmitter interface 812 may provide the co-channel interference cancellation (CIC) signal processing module 815 with one or more correction signals from one or more transmitters or receivers that may be used in the CIC processing described above. The transmitter interface may deliver the appropriate data signal from the signal and data processor to a transmit circuit and subsequently an antenna to be transmitter or sent to a second radio head.

The receiver interface 813 may electrically couple the signal and data processor 810 to one or more receive circuits of a radio head and subsequently one or more receive antennas. The receiver interface 813 may deliver the received data signal from the receive circuits to the signal and data processor for further processing including CIC processing as described herein. The signal and data processor 810 may receive a signal including a transmitted data signal and interfering signals through the receiver interface 813, may perform a method including CIC processing using a co-channel interference cancellation processing module 815, including the processing for cross polarized co-channel signals, located on a machine readable medium 814 of the signal and data processor 810 to remove the interfering signals using a determined correction signal from the transmitter interface 813, and from a receiver configured to receive a cross polarized co-channel signal, and may output the processed transmitted data signal using a data interface 816. Simultaneously, the signal and data processor 810 may be receiving a data input through the data interface 816, may generate a data signal to be transmitted using the transmit circuit, and may send the data to the transmit circuit through the transmitter interface 812. Accordingly, the data and signal processor 810 may ensure the radio head receives transmitted signals from a second radio head, transmits data inputs to the second radio head, and otherwise ensures the communication system operates correctly. The signal and data processor 810 may also comprise (or be coupled to) any other processors, software modules, and/or hardware modules to complete any other tasks or activities necessary to ensure correct operation of the communication system as described herein.

The terms "machine readable medium" and "computer readable medium," as used herein, refer to any medium that participates in providing data that causes a machine to operate in a specific fashion. In an embodiment of the present invention implemented using a radio head as described herein, various machine-readable media might be involved in providing instructions/code to processors for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as storage devices. Volatile media includes, without limitation, dynamic memory, such as the working memory. Transmission media includes coaxial cables, copper wire, and fiber optics, including the wires that comprise a system bus and interconnect the various elements of the signal and data processor shown in FIG. 8, as well as various components of subsystems such as a communications subsystem or network delivery interface (and/or the media by which the communications subsystem provides communication with other devices).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, or any other medium from which a computer can read instructions and/or code.

Various forms of machine-readable media may be involved in carrying one or more sequences of one or more instructions to the computer processor for execution. Merely by way of example, the instructions may initially be carried on a magnetic disk and/or optical disc of a remote computer. A remote computer might load the instructions into its dynamic memory and send the instructions as signals over a transmission medium to be received and/or executed by point-to-point radio systems and point-to-multipoint radio systems as described herein. These signals, which might be in the form of electromagnetic signals, acoustic signals, optical signals, and/or the like, are all examples of carrier waves on which instructions can be encoded, in accordance with various embodiments of the invention.

The present disclosure describes presently preferred embodiments so that an understanding of the present invention can be conveyed. There are, however, many configurations of systems for data communications and, more particularly, for simultaneous bidirectional transmission for radio systems not specifically described herein but with which the present invention is applicable. The present invention should therefore not be seen as limited to the particular embodiments described herein, but rather, it should be understood that the present invention has wide applicability with respect to data communications systems generally. All modifications, variations, or equivalent arrangements and implementations that are within the scope of the attached claims should therefore be considered within the scope of the invention.

We claim:

1. A method of communicating between first and second radio heads of a line-of-sight point-to-point radio communications link, wherein the first radio head comprises:
  a first transmitter,
  a first receiver,
  a first processor,
  a first directional antenna connected to the first transmitter, and
  a second directional antenna connected to the first receiver,
wherein the second radio head comprises:
  a second transmitter,
  a second receiver,
  a second processor,
  a third directional antenna connected to the second transmitter, and
  a fourth directional antenna connected to the second receiver,
wherein the first and second radio heads are at first and second respective fixed radio head locations with a direct line of sight between the first and second radio head locations,
wherein the radio communications link comprises a first data path from the first radio head to the second radio head and a second data path from the second radio head to the first radio head,
wherein the method comprises:
  transmitting a first signal from the first transmitter via the first antenna;
  receiving the first signal at the second receiver via the fourth antenna;
  transmitting a second signal from the second transmitter via the third antenna;
  receiving the second signal at the first receiver via the second antenna,
  with the first and second directional antennas, isolating the first and second signals from one another such that:
    a) damage or degradation of the first receiver by the first signal is prevented, and
    b) the first receiver and the first processor are collectively configured to recover the second signal; and
    with the third and fourth directional antennas, isolating the first and second signals from one another such that:
    a) damage or degradation of the second receiver by the second signal is prevented, and
    b) the second receiver and the second processor are collectively configured to recover the first signal,
    wherein the first and second signals are both in a same allocated frequency band, and
wherein the first and second signals are independent of one another and are transmitted in opposite directions of the communications link,
wherein:
the radio communications link comprises a third data path from the first radio head to the second radio head and a fourth data path from the second radio head to the first radio head,
wherein the first radio head further comprises:
  a third transmitter,
  a third receiver,
  a fifth directional antenna connected to the third transmitter, and
  a sixth directional antenna connected to the third receiver,
and wherein the second radio head further comprises:
  a fourth transmitter,
  a fourth receiver,
  a seventh directional antenna connected to the fourth transmitter, and
  an eighth directional antenna connected to the fourth receiver,
wherein the method further comprises:
  transmitting a third signal from the third transmitter via the fifth antenna;
  receiving the third signal at the fourth receiver via the eighth antenna;
  transmitting a fourth signal from the fourth transmitter via the seventh antenna;
  receiving the fourth signal at the third receiver via the sixth antenna,
  with the fifth and sixth directional antennas, isolating the third and fourth signals from one another such that:
    a) damage or degradation of the third receiver by the third signal is prevented, and
    b) the third receiver and the first processor are collectively configured to recover the fourth signal; and
  with the seventh and eighth directional antennas, isolating the third and fourth signals from one another such that:
    a) damage or degradation of the fourth receiver by the fourth signal is prevented, and
    b) the fourth receiver and the second processor are collectively configured to recover the third signal, and
wherein the first, second, third, and fourth signals are all in a same allocated frequency band,
wherein the first, second, third, and fourth signals are at the same center frequency, and wherein a transmission radiation polarity for the first and second signals is the same and is orthogonal to a transmission radiation polarity for the third and fourth signals,
wherein bandwidths of the third and fourth signals are at the same center frequency, a portion of the third signal is received by the sixth antenna, and a portion of the fourth signal is received by the eighth antenna, and wherein the method further comprises:
  with a third processor, determining a third correction signal based on the third signal;
  with the third processor, based on the third correction signal, reducing the received portion of the third signal component from the fourth signal;
  with a fourth processor, determining a fourth correction signal based on the fourth signal; and
  with the fourth processor, based on the fourth correction signal, reducing the received portion of the fourth signal component from the third signal.

2. The method of claim 1, wherein the first antenna and the second antenna include one or more of a lens horn, a waveguide slot array, a continuous transverse stub array, or a trough guide array.

3. The method of claim 1, wherein the first antenna and the second antenna are high isolation antennas.

4. The method of claim 1, wherein the first and second signals are transmitted at substantially the same time.

5. A method of communicating between first and second radio heads of a line-of-sight point-to-point radio communications link,
wherein the first radio head comprises:
  a first transmitter,
  a first receiver,
  a first processor,
  a first directional antenna connected to the first transmitter, and
  a second directional antenna connected to the first receiver, wherein the second radio head comprises:
a second transmitter,
a second receiver,
a second processor,
a third directional antenna connected to the second transmitter, and
a fourth directional antenna connected to the second receiver,
wherein the first and second radio heads are at first and second respective fixed radio head locations with a direct line of sight between the first and second radio head locations,
wherein the radio communications link comprises a first data path from the first radio head to the second radio head and a second data path from the second radio head to the first radio head,
wherein the method comprises:
transmitting a first signal from the first transmitter via the first antenna;
receiving the first signal at the second receiver via the fourth antenna;
transmitting a second signal from the second transmitter via the third antenna;
receiving the second signal at the first receiver via the second antenna,
with the first and second directional antennas, isolating the first and second signals from one another such that:
a) damage or degradation of the first receiver by the first signal is prevented, and
b) the first receiver and the first processor are collectively configured to recover the second signal; and
with the third and fourth directional antennas, isolating the first and second signals from one another such that:
a) damage or degradation of the second receiver by the second signal is prevented, and
b) the second receiver and the second processor are collectively configured to recover the first signal,
wherein the first and second signals are both in a same allocated frequency band, and
wherein the first and second signals are independent of one another and are transmitted in opposite directions of the communications link,
wherein bandwidths of the first and second signals are at the same center frequency, a portion of the first signal is received by the second antenna, and a portion of the second signal is received by the fourth antenna, and wherein the method further comprises:
with the first processor, determining a first correction signal based on the first signal;
with the first processor, based on the first correction signal, reducing the received portion of the first signal component from the second signal;
with the second processor, determining a second correction signal based on the second signal; and
with the second processor, based on the second correction signal, reducing the received portion of the second signal component from the first signal.

6. The method of claim 5, wherein the first antenna and the second antenna include one or more of a lens horn, a waveguide slot array, a continuous transverse stub array, or a trough guide array.

7. The method of claim 5, wherein the first antenna and the second antenna are high isolation antennas.

8. The method of claim 5, wherein the first and second signals are transmitted at substantially the same time.

9. The method of claim 5, wherein:
the radio communications link comprises a third data path from the first radio head to the second radio head and a fourth data path from the second radio head to the first radio head,
wherein the first radio head further comprises:
a third transmitter,
a third receiver,
a fifth directional antenna connected to the third transmitter, and
a sixth directional antenna connected to the third receiver,
and wherein the second radio head further comprises:
a fourth transmitter,
a fourth receiver,
a seventh directional antenna connected to the fourth transmitter, and
an eighth directional antenna connected to the fourth receiver,
wherein the method further comprises:
transmitting a third signal from the third transmitter via the fifth antenna;
receiving the third signal at the fourth receiver via the eighth antenna;
transmitting a fourth signal from the fourth transmitter via the seventh antenna;
receiving the fourth signal at the third receiver via the sixth antenna,
with the fifth and sixth directional antennas, isolating the third and fourth signals from one another such that:
a) damage or degradation of the third receiver by the third signal is prevented, and
b) the third receiver and the first processor are collectively configured to recover the fourth signal; and
with the seventh and eighth directional antennas, isolating the third and fourth signals from one another such that:
a) damage or degradation of the fourth receiver by the fourth signal is prevented, and
b) the fourth receiver and the second processor are collectively configured to recover the third signal, and
wherein the first, second, third, and fourth signals are all in a same allocated frequency band.

10. The method of claim 9, wherein the first, second, third, and fourth signals are at the same center frequency, and wherein a transmission radiation polarity for the first and second signals is the same and is orthogonal to a transmission radiation polarity for the third and fourth signals.

* * * * *